United States Patent [19]

Ghafghaichi et al.

[11] 3,710,207

[45] Jan. 9, 1973

[54] POSITIONAL DEPENDENCY MONOLITHIC IMPEDANCE

[75] Inventors: Majid Ghafghaichi, Poughkeepsie, N.Y. 12603; Daniel Tuman, Beacon, N.Y. 12508

[73] Assignee: International Business Machines Corporation, Armonk, N.Y.

[22] Filed: March 30, 1971

[21] Appl. No.: 129,418

[52] U.S. Cl. ...........317/235 R, 307/303, 317/235 D, 317/235 E, 317/234 U

[51] Int. Cl. .............................................H01l 19/00

[58] Field of Search.........317/101 A, 235 D, 235 E, 234 U; 307/303, 304

[56] References Cited

UNITED STATES PATENTS 3,540,010 11/1970 Heightley et al. .................... 317/235

OTHER PUBLICATIONS

IBM Tech. Discl. Bul., "Integrated Monolithic RC Circuit" by Feinberg et al., Vol. 12, No. 12, May, 1970 page 2049

IBM Tech. Discl. Bul., "Monolithic RC Filter" by Najmann, Vol. 11, No. 7, Dec. 1968 page 866

*Primary Examiner*—Jerry D. Craig

*Attorney*—Hanifin & Jancin and Kenneth R. Stevens

[57] ABSTRACT

Diffused impedance regions are precisely tuned by tailoring electrically interconnected circuitous epitaxial channels.

3 Claims, 3 Drawing Figures

INVENTORS
MAJID GHAFGHAICHI
DANIEL TUMAN

BY Kenneth R. Stevens
ATTORNEY

POSITIONAL DEPENDENCY MONOLITHIC IMPEDANCE

BACKGROUND OF THE INVENTION

This invention relates to monolithic circuits and more particularly to a precisely tuned monolithic impedance.

In monolithic technology, the master slice approach is often employed as an efficient and economical manufacturing technique. Essentially, the master slice approach fabricates a plurality of predetermined active and passive integrated circuit devices on a single substrate. The user is then able to selectively interconnect the plurality of components in his own desired manner within the overall functional capability of the original design.

Technological improvements in the device and process area are of course incorporated into successive master slice designs. These design changes often require layout rearrangement. However, it is often imperative that the circuits located on the improved master slices present identical electrical characteristics as that of the master slice which it is replacing in order to be system compatible. One critical parameter is the AC time delay of the master slice electrical circuits.

Unexpectedly, it was found that some of the newly designed master slice arrangements possessed unaccountable and variable time delays with regard to their electrical characteristics. Conventional criteria did not explain this variable AC time delay in progressing from one improved master slice to another.

SUMMARY OF THE INVENTION

It is therefore an object of this invention to provide an improved master slice arrangement of electrical circuits which possesses precisely controllable AC time delay characteristics.

The present invention provides a precise AC time delay characteristic in a monolithic circuit master slice arrangement by selectively combining a circuitous epitaxial channel with a diffused RC impedance.

DESCRIPTION OF THE PREFERRED EMBODIMENT

Figure 1:
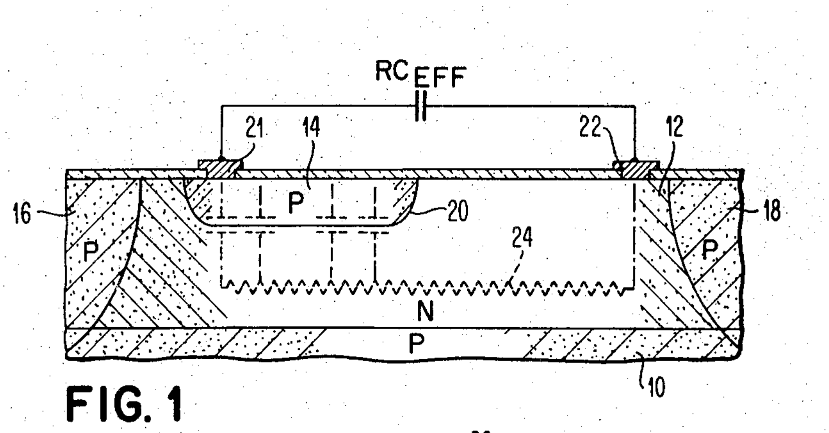
FIG. 1 is an electrical schematic representation showing a cross section of a monolithic circuit and illustrating the manner of precisely controlling the AC time delay characteristics of the overall master slice.

Now referring to FIG. 1, it illustrates a partial cross-sectional view of a P type substrate 10 over which has been formed an N type epitaxial region 12. A conventional P type diffused resistor 14 is formed in the epitaxial region 12. Conventional P type isolation regions 16 and 18 are used to electrically isolate the P type resistor 14.

The P type resistor 14 possesses an intrinsic ohmic value and in addition provides a capacitive component due to the junction formed by the P type resistor material and the N type epitaxial region 12. This equivalent capacitance is illustrated by the plurality of capacitors, shown dotted, at junction 20.

Prior to the present invention, the overall RC effects of resistors such as 14 in the monolithic circuit were calculated according to well known design standards which took into account the area of junction 20 and the doping level of the P type resistor 14, etc. Unaccountably, it was found that the AC time delay contributed to the RC portions of the resistor, such as that shown at 14, was not as desired. In other words, the net impedance, shown as $RC_{EFF'}$ as measured between contacts 21 and 22 did not provide the desired time delay.

Although the prior art clearly teaches that the epitaxial region per se possesses some distributed impedance, for example, as represented by element 24 it was totally unexpected that the distributed impedance had any significant effect on the RC value of the resistor 14. The present invention identified this unexpected influence of the epitaxial region on the overall AC time characteristics.

Figures 2, 3:
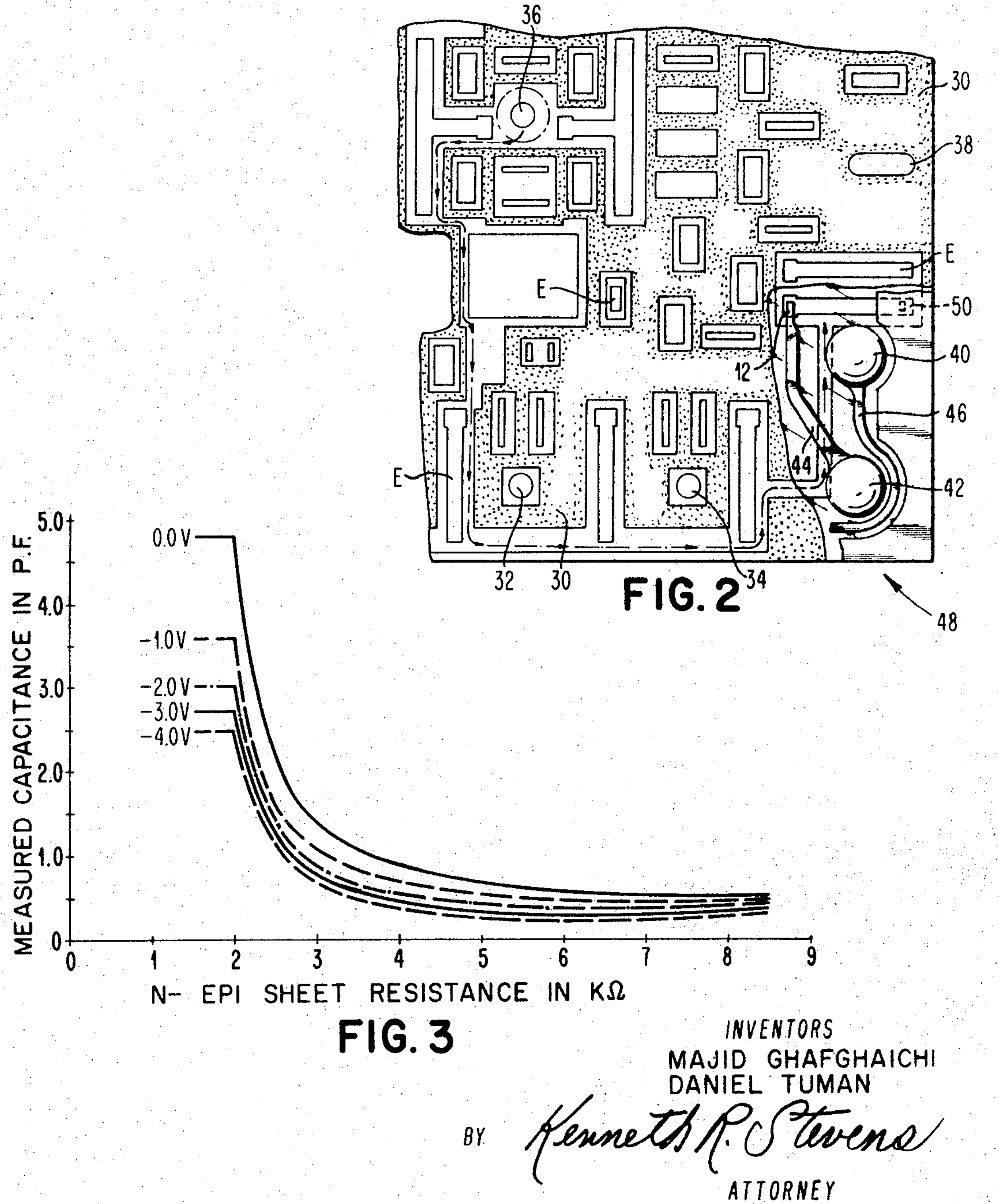
FIG. 2 is a partial plan view of a master slice illustrating the circuitous epitaxial channel used to precisely control the AC time delay characteristics.
FIG. 3 is a plot showing a series of curves which illustrate the unexpected influence of the epitaxial channel on the overall AC time delay characteristics of the master slice arrangement.

Now referring to FIG. 2, it illustrates a partial plan view of a plurality of active and passive monolithic circuits and elements, and illustrates a preferred monolithic structure for obtaining precise AC time delay characteristics. The elements generally are illustrated by the designation E and comprise such components as transistors and resistors. An isolation diffusion illustrated by the speckled area 30 is formed in a well known manner, for example, by a P type diffusion, in order to electrically isolate the elements during operation of the master slice circuits. Elements 32, 34, 36, 38, represent conventional monolithic metal pads. A plurality of ohmic contacts 40 and 42 provide electrical interconnection access to the monolithic circuits. Metallization lines 44 and 46 overlie a glass passivation layer, partially shown at 48. In order to illustrate the present invention, a P type resistor 50 is connected at one of its ends by metallization line 44 to the ohmic contact 42. Ohmic contact 42 approximately corresponds to the contact 21 shown in FIG. 1. The other end of the P resistor 50 is connected via an epitaxial channel to metal pad 36. The epitaxial channel is illustrated by the dotted arrows which trace a circuitous path between metal pad 36 and the P type resistor 50.

The RC distributed impedance between metal pad 36 and ohmic contact 42 is precisely controlled by controlling the epitaxial channel or circuitous path designated by the dotted arrows. This dimension is exactingly controlled by the area of the isolation diffusion region 30.

FIG. 3 illustrates how significantly the N-epitaxial sheet resistance, plotted in kilo ohms along the X axis, influences the capacitance between metal pad 36 and ohmic contact 42. A plurality of curves are shown for different values of reverse bias at the isolation junction. The curves illustrate the unexpected phenomena, that is, the epitaxial channel provides a 3–5 fold effect on the capacitive value associated with a diffused resistor such as that shown as element 50. Prior to the present invention, no consideration or criticality was imparted to the circuitous epitaxial channel associated with such diffused resistors.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. In a masterslice comprising

A. a substrate of first conductivity type,

B. an epitaxial region of opposite conductivity type located over said substrate, C. a plurality of active and passive semiconductor elements located in said epitaxial region adapted for interconnection, D. a monolithic circuit impedance element having an AC capacitance characteristic, said impedance element comprising 1. a diffused capacitive impedance region of first conductivity type located in said epitaxial region and forming a PN junction therein, 2. a first electrical contact to said diffused capacitive impedance region, 3. a second electrical contact connected to said epitaxial region, spaced from and located remote of said diffused capacitive impedance region, 4. means connected to said contacts to operate said impedance element as an AC capacitive device wherein the improvement comprises a circuitous epitaxial channel extending from said second contact to said PN junction of said diffused capacitive impedance region, 5. said circuitous channel being defined by an isolation region located in said epitaxial region, the isolation region being contiguous to said circuitous epitaxial channel, and the planar area of said isolation region being of a predetermined dimension so as to control the dimension of said circuitous epitaxial channel and thus define the AC time characteristics of said diffused capacitive impedance region, and E. the combination of said PN junction of said diffused capacitive impedance region and the circuitous epitaxial channel being operative to provide a precisely valued AC time delay.

2. In a masterslice, as in claim 1 wherein: A. said first electrical contact comprises an ohmic contact and a metallized line, and B. said second electrical contact comprises a metal pad located in said epitaxial region.

3. In a masterslice, as in claim 2 wherein: A. said substrate comprises a P type material, B. said epitaxial region comprises an N type material, C. said diffused capacitive impedance region comprises a P type material, and D. said isolation region comprises a P type material.

* * * * *